No. 728,285. PATENTED MAY 19, 1903.
G. W. PACKER.
METHOD OF MAKING METAL WHEELS.
APPLICATION FILED AUG. 9, 1902.
NO MODEL.
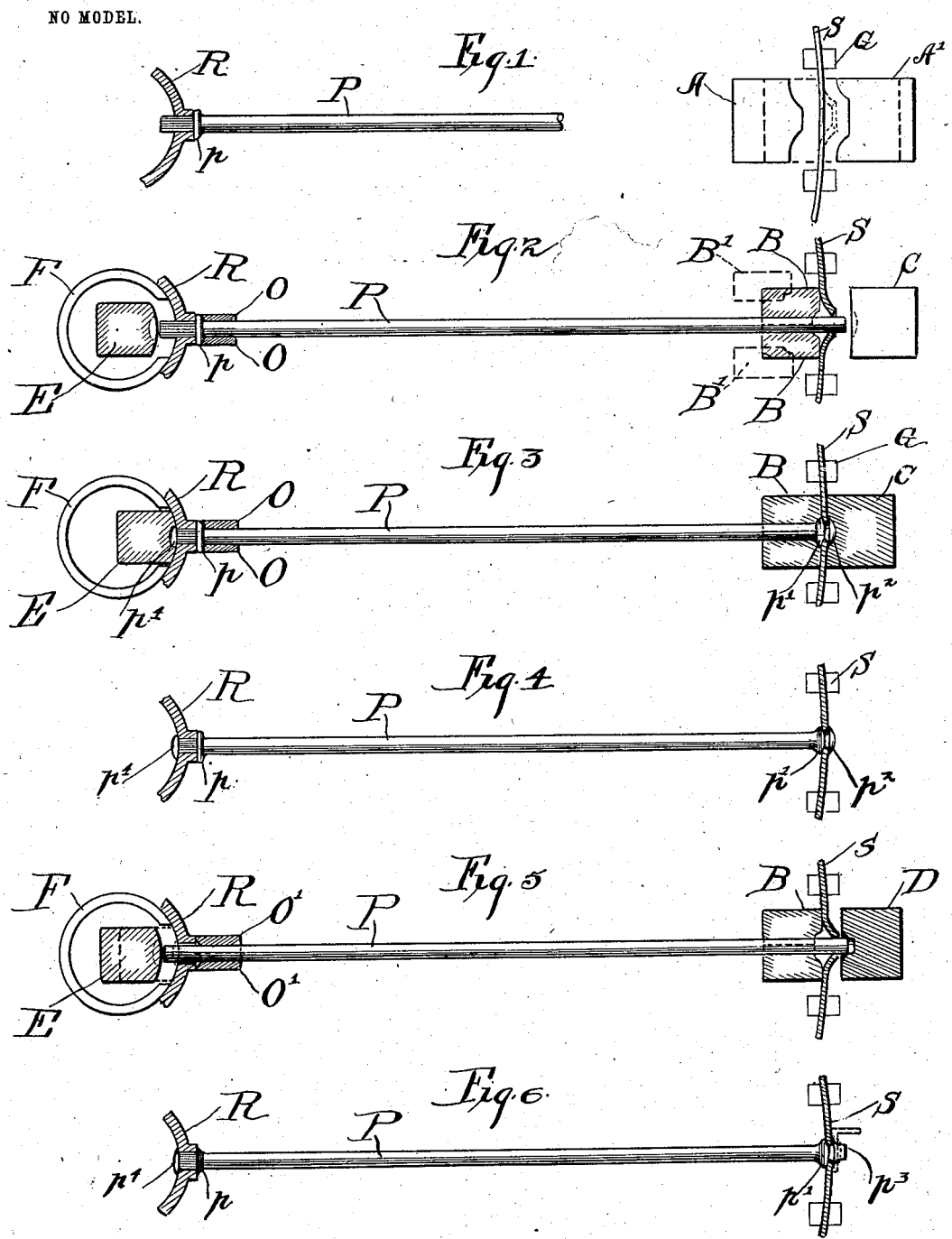
Witnesses:
Torris H. Alfords
J. C. Warner
Inventor:
George W. Packer
John F. Steward
By
Attorney No. 728,285. Patented May 19, 1903.

UNITED STATES PATENT OFFICE.

GEORGE W. PACKER, OF CHICAGO, ILLINOIS, ASSIGNOR TO DEERING HARVESTER COMPANY, OF CHICAGO, ILLINOIS.

METHOD OF MAKING METAL WHEELS.

SPECIFICATION forming part of Letters Patent No. 728,285, dated May 19, 1903.

Application filed August 9, 1902. Serial No. 119,003. (No model.)

*To all whom it may concern:*

Be it known that I, GEORGE W. PACKER, of Chicago, in the county of Cook and State of Illinois, have invented certain new and useful Improvements in Methods of Making Metal Wheels, of which the following is a full description, reference being had to the accompanying drawings.

The object of my invention is to facilitate and simplify the operations in the manufacture of metal wheels, and this I accomplish by the use of the novel methods hereinafter described.

The particular feature of my invention relates to the peculiar manner of forming the shoulder and head on the outer end of the spoke and simultaneously riveting it to the rim of the wheel.

Figure 1 represents a fragment of a hub, spoke, and rim with accompanying dies for flaring the holes. Fig. 2 shows the spoke in place, but the heads and shoulders not formed. Fig. 3 is a view of same with the heads and shoulders formed, but the dies still in contact. Fig. 4 represents a completed spoke and fragments of the adjacent rim and hub, and Figs. 5 and 6 are views showing a modified form of head with corresponding die.

In my method of constructing the wheel I prefer and have shown spokes with one shoulder already formed and cut to proper length. Preliminary to inserting the spokes in the hub and the rim the rim, which has previously been drilled for the spokes, is subjected to the action of the dies A and A', as shown in Fig. 1, the full lines representing the position of the dies before or after the operation and the dotted lines the dies when the same are in contact with the rim. The effect of the action of these dies is to flare the metal out around the holes which have been drilled, as shown in Figs. 2 and 5 in full lines and in Fig. 1 in dotted lines. These holes are drilled, preferably, smaller than the spokes; but when spread and flared in the manner just described they will be just large enough to receive the spokes.

After inserting the outer end of the spoke P in the flared hole of the rim and the inner end in the hub R until the shoulder $p$ of the said spoke bears against the said hub the spoke will be ready for the action of the dies. The jaws B B are then moved from the position shown by dotted lines B' B' and closed upon and clamped to the spoke P, as shown in full lines in Fig. 2. The jaws B B are recessed in such a manner as to form a die for the shoulder to be formed beneath the rim. The spoke is heated at its outer end and may be heated at its other end, if desirable, before placing in position, and after the jaws B B are clamped, as just described, it is ready for the action of the heading-tools C and E, which may be simultaneous or successive.

F represents a support for the hub, and G supports for the rim during the operation, while O O are jaws sustaining the spoke at the shoulder $p$ when the heading-tool E forms the head $p^4$. The heading-tool C when pressed down upon the hot end of the spoke P, Fig. 2, will upset the end, forming a shoulder beneath the rim in the said recess between the said rim and the recessed jaws, press the flared metal around the spoke to substantially its original position, and form the head outside the rim, all in a single operation. In pressing the flared metal of the rim down around the spoke the size of the opening will naturally be decreased, the edges in consequence forcing themselves into the soft metal of the hot spoke and the effect being to more securely fix the said spoke to said rim. The shoulder beneath the rim is thus formed of the upset portion of the original stock between the inner or lower edge of the flared-up portion of the metal around the hole and the gripping edge around the recessed jaws.

As stated above, the head $p^4$ on the other end of the spoke may be formed at the same time the outer shoulder and head are formed, and Fig. 3 shows the jaws and heading-tools in position after forming the shoulder and heads. Fig. 4 shows the completed spoke after the heading-tools and jaws have been retracted.

The heading-tool C forms a plain head, as shown in Fig. 4; but in lieu of this a modified form of head may be made, as $p^3$. (Shown in Fig. 6.) Such a modification is adapted to furnish means for securing lugs provided on the rims of wheels to increase their tractional effect when used for driving various mechanism, such as harvesting-machines. This modified form of head is made by simply changing the heading-tool from the kind shown by C, Figs. 2 and 3, to that of D, Fig. 5, and making the spoke enough longer to furnish the extra stock required.

I have shown only enough of the wheel and parts of the machine used in the construction of the same as is necessary to illustrate my method and these parts merely diagrammatic in their nature. The machine I propose to use will form the subject-matter of another application.

While I prefer to form on the spoke the shoulder abutting against the hub before putting the spoke in the wheel and machine, yet I do not limit myself to such a procedure, for it is clearly evident that the shoulder could be formed on the spoke next the hub also after the spoke was in the wheel by an additional set of jaws operating similar to the jaws B B at the rim. The jaws O' O', Fig. 5, are modified forms of the jaws O O, Figs. 2 and 3, adapted to coöperate with the heading-tool E in the simultaneous forming of the head $p^4$ and shoulder $p$, as shown in Fig. 5, before the operation, and complete in Fig. 6. The jaws O' O' are recessed similar to the jaws B B, and the spoke-hole in the hub is somewhat larger than the spoke as shown in Fig. 5. There is sufficient stock extending inwardly or toward the center of the hub from the edges of the recessed jaws O' O' so that when the end of the spoke, which is of course heated in this case, is upset by the heading-tool E the recessed portion of the said jaws, the annular space in the hub around said spoke, and the recess in said heading-tool will all become filled with metal, thus forming a shoulder without the hub and a head within the hub. This operation may of course be performed simultaneously or successively relative to the shoulder and head forming operation at the rim end of the spoke.

In connection with the formation of the shoulder and special head at the rim end of the spoke it may also be said that I do not limit myself to the method in which a shoulder is formed outside the rim in such a way that it will occupy a countersunk space in the cleat to be attached to these special heads; but the head may be formed outside both the rim and cleat, so that the one head will retain both the cleat and spoke in position.

What I claim as my invention, and desire to secure by Letters Patent, is—

1. In the manufacture of metal wheels, the method of securing the spokes to the rim, the same consisting in forming holes in the rim with outwardly-flared edges, inserting the spokes in the holes, and pressing the flared edges back into their original position, thereby forcing them into the metal of the spokes.

2. In the manufacture of metal wheels, the method of securing the spokes to the rim, the same consisting in forming holes in the rim with outwardly-flared edges, inserting the spokes in the holes, pressing the flared edges back into their original position, and forming shoulders on the spokes against the inner side of the rim.

3. In the manufacture of metal wheels, the method of securing the spokes to the rim, the same consisting in forming holes in the rim with outwardly-flared edges, inserting the spokes in the holes, pressing the flared edges back into their original position, and forming heads on the ends of the spokes against the outer side of the rim.

4. In the manufacture of metal wheels, the method of securing the spokes to the rim, the same consisting in forming holes in the rim, flaring outwardly the metal surrounding the holes, inserting the spokes in the holes, pressing the flared edges of the holes back into their original position so as to force them into the metal of the spokes, and simultaneously forming shoulders on the spokes inside the rim and heads on the spokes outside the rim.

GEORGE W. PACKER.

In presence of—
J. C. WARNES,
EDW. R. BARRETT.